United States Patent [19]
Kim et al.

[11] Patent Number: 5,680,291
[45] Date of Patent: Oct. 21, 1997

[54] LOW-TEMPERATURE SINTERABLE DIELECTRIC COMPOSITION WITH HIGH DIELECTRIC CONSTANT AND MULTI-LAYERED CERAMIC CAPACITOR USING THE SAME

[75] Inventors: Yoon Ho Kim; Hyo Tae Kim, both of Seoul, Rep. of Korea

[73] Assignee: Korea Institute of Science and Technology, Seoul, Rep. of Korea

[21] Appl. No.: 577,973

[22] Filed: Dec. 22, 1995

[30] Foreign Application Priority Data

Dec. 23, 1994 [KR] Rep. of Korea .................. 36443/1994

[51] Int. Cl.$^6$ ............................ H01G 4/06; C04B 35/46; C04B 35/49
[52] U.S. Cl. ...................... 361/321.4; 361/321.1; 361/321.5; 501/134; 501/135; 501/136
[58] Field of Search ............................ 501/108, 134–136; 252/62.9 PZ; 429/209, 220; 361/311–313, 320, 321.1, 321.2, 321.3, 321.4, 321.5

[56] References Cited

FOREIGN PATENT DOCUMENTS 1225304  12/1989  Japan .
2157155  9/1990  Japan .

OTHER PUBLICATIONS

Kim et al., Low–firing Pb(Mg1/3Nb2/3)O3–PbTiO3–Pb5Ge2SiO11 Compositions for Thick film Capacitor Applications, Proceedings of the Ninth IEEE International Symposium on Applications of Ferroelectrics, pp.585–588 of xix+855. Aug. 1994.

*Primary Examiner*—Bot L. Ledynh
*Attorney, Agent, or Firm*—Darby & Darby

[57] ABSTRACT

A low-temperature sinterable dielectric composition with a high dielectric constant is disclosed wherein x=2–4 mol %, y=0.5–3.0 mol % and z=3–5 mol % in [95PMN-5PT]-x(PbO)-y(CaO)-z(CuO).

2 Claims, 3 Drawing Sheets

LOW-TEMPERATURE SINTERABLE DIELECTRIC COMPOSITION WITH HIGH DIELECTRIC CONSTANT AND MULTI-LAYERED CERAMIC CAPACITOR USING THE SAME

BACKGROUND OF THE INVENTION

The present invention relates to a low temperature sinterable dielectric composition with a high dielectric constant, a multi-layered ceramic capacitor using the same, and a manufacturing method therefor, and more particularly, to a dielectric composition having a high dielectric constant, anti-reduction characteristics and low-temperature sinterability, a multi-layered ceramic capacitor having a copper internal electrode using the composition, and a manufacturing method therefor.

Recently, along with the high-density integration of electronic components and circuits of high frequencies, capacitors have been required to have larger capacitance and be more miniature in size. This increases the demand for multi-layered ceramic capacitors (hereinafter refer to as MLCs). The miniaturized size and higher density of MLC requires its dielectric film to be thinner and more stacked, and to have a higher dielectric constant. Accordingly, the biasing and signal voltage characteristics of the dielectric material must be improved against the deterioration of dielectric characteristics caused by the usage of a low-cost internal electrode and thin-film construction.

SUMMARY OF THE INVENTION

Therefore, it is an object of the present invention to reduce the fabrication cost of a high-capacitance multi-layered MLC and to enhance its dielectric characteristics using a low-cost internal electrode and a dielectric ceramic composition of high dielectric constant.

In order to accomplish the object of the present invention, there is provided a low-temperature dielectric composition with a high dielectric constant and anti-reduction characteristics, and a method of fabricating an MLC with a copper internal electrode using the composition.

BRIEF DESCRIPTION OF THE ATTACHED DRAWINGS

DETAILED DESCRIPTION OF THE INVENTION

Figure 1:
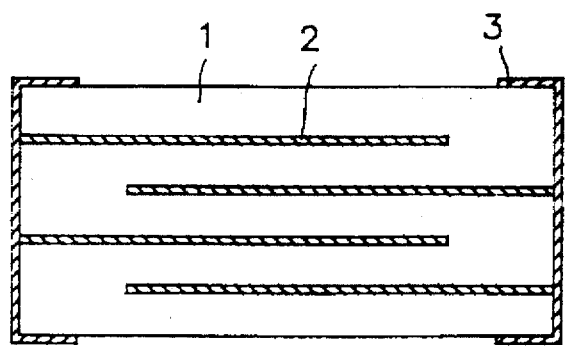
FIG. 1 is a cross-sectional view of a multi-layered ceramic capacitor of the present invention.

Hereinafter, preferred embodiments of the present invention will be described below with reference to the attached drawings, but the present invention is not limited to these.

Generally, in order to use a base metal such as Ni or Cu as an MLC internal electrode, such base metal must be sintered under low oxygen partial pressure, that is, a reduction atmosphere to prevent oxidation during firing. Cu has a melting point of 1,083° C. thus its sintering temperature must be less than the point by at least 50° C. in case Cu is to be used for internal electrode production. When copper is used for the internal electrode, the dielectric ceramic is in a reduction atmosphere where oxygen partial pressure is $10^{-3}$ Pa at 900° C. The reason why copper is selected as the material of the internal electrode is because it has a higher equilibrium oxygen partial pressure than that of base metals such as Ni, Fe and Co, and thus there is less reduction effect to the dielectric material.

For the limit oxygen partial pressure at which the dielectric material is reduced, a equilibrium oxygen partial pressure where, of elements forming the dielectric material, an element easiest to be reduced has a lower valence from a higher valence, should be considered. For an MLC using copper as its internal electrode and in consideration of the dielectric's anti-reduction characteristics, the dielectric material must not be reduced until an oxygen partial pressure which is lower than copper's equilibrium oxygen partial pressure, is reached below the sintering temperature, and must also exhibit high resistivity.

J. Kato reported that in case of a PMN-PT-PNW composition, excessive A-site or adding alkaline-earth metal results in anti-reduction characteristics. For excessive A-site, Pb is added excessively or Pb is replaced with Ca. Here, it is known that, Ca may be replaced by Ba or Sr, to achieve the same effects.

In the present invention, excess A-site and alkaline-earth metal addition are both employed in order to guarantee that the Pb-based dielectric composition has anti-reduction characteristics. Specifically, as a reduction-resistant agent, PbO of over 2 mol % and CaO of 0.5–3.0 mol % are added to the main PMN-PT composition for its reduction-resistance. Further, as the sintering aid agent and inhibitor of pyrochlore phase formation, CuO is added to form a liquid phase due to the eutectic point of PbO—CaO—CuO, for lowering the sintering temperature and suppressing the formation of pyrochlore phase to enhance the dielectric constant. A method of manufacturing the dielectric ceramic composition of the present invention will be described below.

As starting materials, reagents of PbO, MgO, $Nb_2O_5$, $TiO_2$ and CuO are used. For CaO when added in minute amounts, $CaCO_3$ is used for the purpose of uniform mixing.

First, after the starting materials are made into a powder and dried for 12 hours at 120° C. and weighed, it is wet-mixed for one hour in a centrifugal planetary mill with a zirconia ball and jar. MgO and $Nb_2O_5$ are mixed and calcined at 1,100°–1,200° C. to form a columbite precursor ($MgNb_2O_6$). This precursor is reacted with PbO at 900° C. for two hours, thereby forming $Pb(Mg_{1/3}/Nb_{2/3})O_3$ (hereinafter, refer to as PMN). $PbTiO_3$ hereinafter, refer to as PT is made by mixing PbO and $TiO_2$ by 1:1 ratio and calcining this mixture at 800° C. for two hours. In the present invention, the heating rate of firing is 300° C./h.

The two main compositions described above are mixed at a ratio of PMN:PT=95:5 and dried while PbO of 2–4 mol %, CaO of 0.5–3 mol % and CuO of 3–5 mol % are added thereto. The resultant is calcined for two hours at 750°–850° C. The calcined powder is then pulverized and dried for two hours. Then, PVA binder of 2 wt % is added thereto, and disk specimens of 10 mm in diameter and 1.2 mm in thickness are formed. These specimens are sintered at 810°–1,100° C. in air and then sintered for 1 hour at 800° C., oxygen partial pressure $P_{O2}$ of $10^{-11}$ atm, in a reduction atmosphere as a cooling process. Ag paste is coated on both sides of the specimens, and then fired for ten minutes at 600° C. under $N_2$ atmosphere, to form electrodes.

The completed specimens are measured using an LCR meter and high resistance meter after charged for one minute, under the conditions of a capacitance of 1 KHz, a dissipation factor of $1V_{rms}$ at normal temperature (20° C.), and an insulation resistance of $50V_{DC}$. The following table 1 shows examples of those compositions and their dielectric properties.

For the starting materials of paste for manufacturing copper internal electrode 2, CuO powder of 1 μm in diameter is used. For outer electrode 3, CuO powder of coarse particles having diameters of 3–5 μm is used. As the organic binder solution, Vehicle #424 (Electro-Science Lab., U.S.A) is used. The composition ratio of the CuO paste for the

TABLE 1

Dielectric Properties of [95PMN-5PT]-x(PbO)-y(CaO)-z(CuO) composition

| | Additives (mol %) | | | Sintering temperature (°C.) | Dielectric Properties | | |
|---|---|---|---|---|---|---|---|
| | | | | | Dielectric constant | Dielectric Loss (%) | Insulation resistance (Ω · cm) |
| | x(PbO) | y(CaO) | z(CuO) | | | | |
| 1 | 0 | 0 | 0 | 1100 | 16500 | 2.4 | $9 \times 10^3$ |
| 2 | 2.0 | 0.5 | 0 | 1000 | 13100 | 1.4 | $8 \times 10^{10}$ |
| *3 | 2.0 | 0.5 | 3.0 | 900 | 14700 | 1.5 | $1 \times 10^{11}$ |
| *4 | 2.0 | 0.5 | 5.0 | 900 | 14200 | 1.8 | $9 \times 10^{10}$ |
| 5 | 2.0 | 1.0 | 0 | 950 | 11800 | 1.0 | $4 \times 10^{11}$ |
| *6 | 2.0 | 1.0 | 3.0 | 875 | 13500 | 1.2 | $1 \times 10^{11}$ |
| *7 | 2.0 | 1.0 | 5.0 | 875 | 16100 | 1.6 | $9 \times 10^{10}$ |
| 8 | 2.0 | 3.0 | 0 | 950 | 8000 | 0.6 | $2 \times 10^{12}$ |
| 9 | 2.0 | 3.0 | 3.0 | 845 | 11300 | 0.8 | $6 \times 10^{11}$ |
| 10 | 2.0 | 3.0 | 5.0 | 845 | 12600 | 1.3 | $8 \times 10^{10}$ |
| *11 | 4.0 | 0.5 | 0 | 950 | 12800 | 1.2 | $6 \times 10^{11}$ |
| *12 | 4.0 | 0.5 | 3.0 | 845 | 15400 | 1.5 | $8 \times 10^{10}$ |
| 13 | 4.0 | 0.5 | 5.0 | 845 | 14700 | 1.6 | $8 \times 10^{10}$ |
| 14 | 4.0 | 1.0 | 0 | 950 | 10900 | 0.7 | $8 \times 10^{11}$ |
| *15 | 4.0 | 1.0 | 3.0 | 810 | 13200 | 1.2 | $2 \times 10^{11}$ |
| *16 | 4.0 | 1.0 | 5.0 | 810 | 12700 | 1.4 | $9 \times 10^{10}$ |
| 17 | 4.0 | 3.0 | 0 | 900 | 7700 | 0.5 | $1 \times 10^{12}$ |
| 18 | 4.0 | 3.0 | 3.0 | 810 | 10600 | 0.9 | $4 \times 10^{11}$ |
| 19 | 4.0 | 3.0 | 5.0 | 810 | 9800 | 1.1 | $3 \times 10^{11}$ |

*indicates the scope of claims of the present invention.

As shown in Table 1, it is noted that anti-reduction characteristics of over $10^{10}$ Ω·cm in insulation resistance can be obtained only with the addition of CaO of 0.5 wt %. However, when CaO of 1.0 wt % is added, the dielectric constant is decreased, anti-reduction characteristics are increased, and sintering temperature is reduced. Meanwhile, the sintering temperature is lowered to 810° C. with the addition of PbO and CuO. In case that a large amount (over 3 mol %) of them is added, it is noted that the dielectric constant and insulation resistance are slightly reduced.

An MLC using such a dielectric ceramic composition will be described below.

Referring to FIG. 1, an MLC of the present invention comprises a dielectric layer 1, internal electrode 2, and outer electrode 3. For dielectric layer 1, composition [95PMN-5PT]-4(PbO)-0.5(CaO)-3(CuO) is selected among compositions having excellent dielectric characteristics of the aforementioned anti-reduction composition. The mixing method for the composition is the same as aforementioned.

The mixed powder is pulverized for two hours into a free powder of below 1 μm in average particle diameter. Slurry is made in order to tape-cast the free powder as a thick film for MLC. The composition ratio of the slurry is dielectric powder: binder solution=64.0:36.0.

The binder solution is one of the polyvinylbutyral group and for the solvent media, a solvent system is used in which toluene and ethanol are mixed in a ratio of 15 wt %:85 wt %, respectively. Here, for the plasticizer, di-n-butyl phthalate of approximately 0.2 wt % is added. The volume ratio of the dielectric powder of the slurry is about 55 vol %. The slurry is used to make a 30 μm-thick sheet on a PE film by the doctor-blade method.

internal electrode is CuO powder:binder solution=67.0:33.0. Here, the final viscosity of the paste is controlled with turpentine oil.

Figure 2:
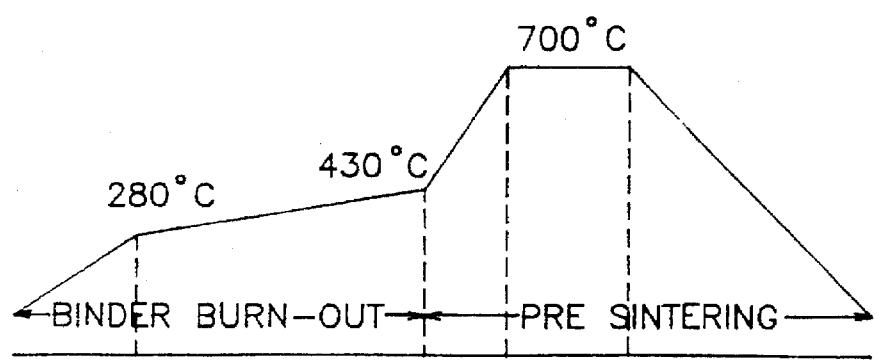
FIG. 2 shows the temperature profiles during an organic binder burn-out and presintering of the present invention.

Internal electrode 2 is printed using an MLC pattern for 1206 size (EIA STD size; L=0.12 inch, w=0.06 inch) which is a standard size, with a stainless 400-mesh screen. The printed sheet is dried for four hours at 80° C. and then stacked to form six active dielectric layers. The result is isostatic-pressed under a pressure of 4,000 psi, and cut into chips with an automatic dicing saw. These unsintered green chips are put into an oven to burn out the organic binder therefrom. The organic binder burn-out and presintering temperatures are illustrated in FIG. 2.

The present invention is characterized in having a presintering process during firing. With such a presintering, fast, the unsintered chips have adequate mechanical strength in order to perform an edge rounding or harperizing process for attaching the CuO paste used for outer electrodes prior to the main sintering. Secondly, the presintering prevents damage or fine cracks due to external impacts. Thirdly, carbon residues of the organic binder or $CaCO_3$ can be removed as completely as possible, preventing the insulation resistance from being reduced due to reduction sintering.

During edge rounding of the chips prior to sintering, productivity can be drastically improved as the rounding time can be reduced to 10–20 minutes from the conventionally required 2–6 hours because of ceramic of the presintering having a low strength. In addition, the chips are polished in a soft state, nearly eliminating possible chipping of the edges as compared with a conventional method in which polishing is done on the hardened chips after sintering, thus improving chip yield.

The presintered chips with their edges polished are ultrasonically washed, and CuO paste is attached thereto in order to form outer electrode 3. This CuO paste for the outer electrode is structured to be slightly porous in order to minimize the stress to the ceramic main body during sintering. For adhesion to the ceramic main body, CuO powder of 3–5 μm is used which is more coarse than the CuO paste for the internal electrodes. A small amount (2.5 wt %) of dielectric powder is added to match the dielectric ceramic during sintering. The composition ratio of the CuO paste for outer electrode of the present invention is CuO powder:binder solution:dielectric powder=72.0:25.5:2.5.

In the CuO paste compositions for internal and outer electrodes of the present invention, the CuO powder can be sufficiently sintered by a reactive sintering mechanism within the desired range of sintering temperature according to the present invention. For this reason, additives such as glass frits to aid the sintering process are not required.

Figure 3:
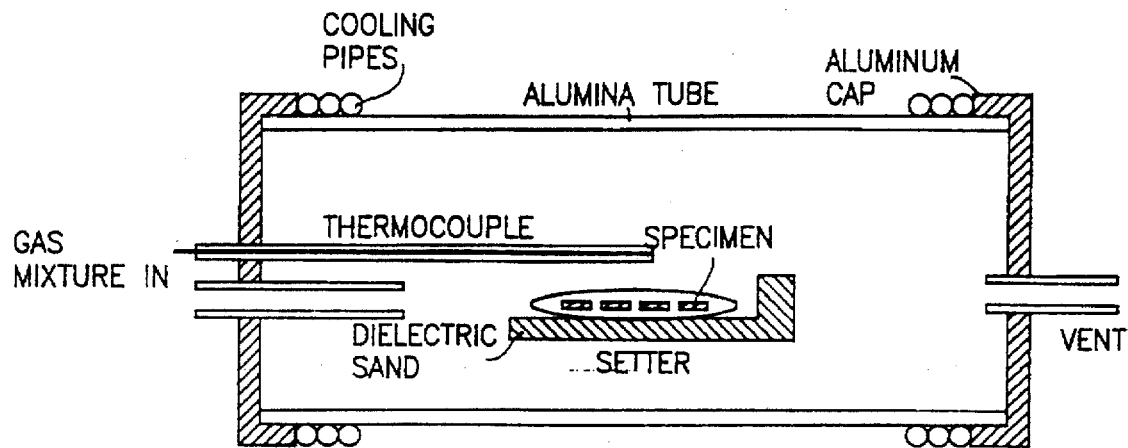
FIG. 3 shows an illustration of specimens loading during sintering of the present invention.

The presintered chips with the outer electrode attached thereto are sintered in a furnace of reduction atmosphere. The mounting structure of the specimens is as shown in FIG. 3. These specimens are mounted in a mullite setter with application of calcination powder having the same composition as that of the specimen.

Figure 4:
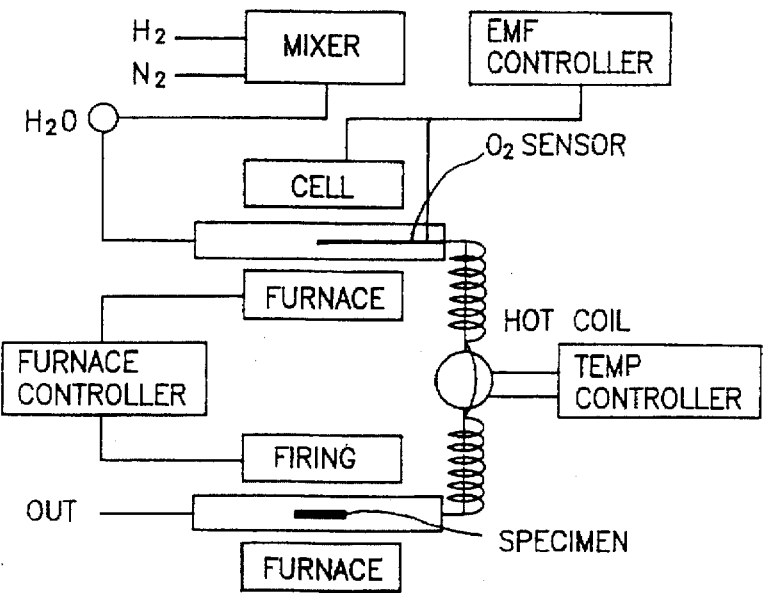
FIG. 4 is a block diagram of a reduction atmosphere firing system of the present invention.

Referring to FIG. 4, a reduction firing furnace system of the present invention controls oxygen partial pressure at 800° C. This control temperature was determined by a stabilized zirconia oxygen sensor in which yttria of 6 mol % was added, using a miniaturized cell furnace and 800° C. was found to allow optimal controllability. This is because the main composition of the present invention is PbO and thus the function of the sensor is deteriorated due to the reaction of the Pt electrode attached to the oxygen sensor with the slight amount of oxygen PbO evaporated during sintering, to disable precise control of oxygen partial pressure. Thus oxygen partial pressure control of the present invention contributes to the elongation of the life span of the oxygen sensor.

Figure 5:
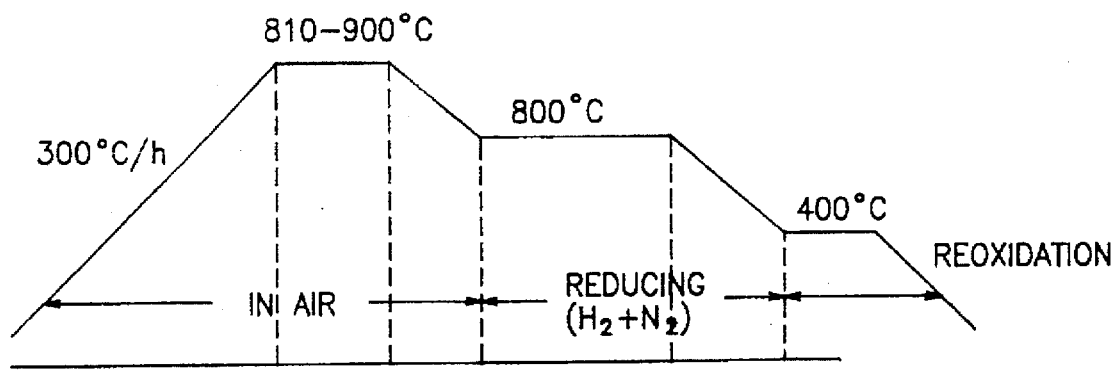
FIG. 5 shows firing temperatures profile of the present invention.

The gas mixed in the miniaturized cell fuace is supplied to the main firing furnace. In the present invention, the mixed gas used for oxygen partial pressure control is $H_2$—$N_2$—$H_2O$. Here, Ni-chrome wire is wound around the connection gases to maintain the temperature thereof above 100° C., to prevent oxygen partial pressure variation due to condensation of the pipes caused by cooling when the oxygen partial pressure controlled mixed gas passes to the sintering furnace. A sintering process used in the present invention is shown in FIG. 5. The following table 2 shows the dielectric characteristics of the MLC specimen having a copper internal electrode sintered by the firing process of the present invention.

TABLE 2

Dielectric Properties having MLC of Copper Internal Electrode

| | Additives (mol %) | | | Sintering | Dielectric Properties | | |
| --- | --- | --- | --- | --- | --- | --- | --- |
| Example | x(PbO) | y(CaO) | z(CuO) | temperature (°C.) | Dielectric constant | Dielectric Loss (%) | Insulation Resistance (Ω · cm) |
| 1 | 2.0 | 0.5 | 3.0 | 900 | 13500 | 2.6 | $7 \times 10^9$ |
| 2 | 2.0 | 0.5 | 5.0 | 900 | 12900 | 3.1 | $2 \times 10^9$ |
| 3 | 2.0 | 1.0 | 3.0 | 875 | 13600 | 2.8 | $1 \times 10^{10}$ |
| 4 | 2.0 | 1.0 | 5.0 | 875 | 14200 | 2.9 | $8 \times 10^9$ |
| 5 | 4.0 | 0.5 | 3.0 | 845 | 13400 | 3.3 | $6 \times 10^9$ |
| 6 | 4.0 | 0.5 | 5.0 | 845 | 15200 | 2.7 | $8 \times 10^9$ |
| 7 | 4.0 | 1.0 | 3.0 | 810 | 13800 | 2.2 | $4 \times 10^9$ |
| 8 | 4.0 | 1.0 | 5.0 | 810 | 12100 | 2.4 | $1 \times 10^9$ |

As shown in table 2, it is noted that the dielectric properties of the reduction sintered MLC is lower than those of the single-plate disk capacitor of table 1. This is because the CuO diffused to the dielectric layer in the soaking temperature range is partially reduced during reduction, thereby lowering the overall dielectric insulation resistance. Therefore, after internal electrode reduction, the present invention is reoxidated at in for two hours around 400° C. which is a low temperature for cooling, for enhancing insulation characteristics. The dielectric properties of the copper internal electrode MLC manufactured by the above-mentioned method will be shown in the following table 3.

TABLE 3

Dielectric Properties of Reoxidated Copper Internal Electrode MLC

| | Additives (mol %) | | | Sintering | Dielectric Properties | | |
| --- | --- | --- | --- | --- | --- | --- | --- |
| Example | x(PbO) | y(CaO) | z(CuO) | temperature (°C.) | Dielectric constant | Dielectric Loss (%) | Insulation resistance (Ω · cm) |
| 1 | 2.0 | 0.5 | 3.0 | 900 | 12400 | 1.9 | $3 \times 10^{10}$ |
| 2 | 2.0 | 0.5 | 5.0 | 900 | 12000 | 2.9 | $1 \times 10^{10}$ |
| 3 | 2.0 | 1.0 | 3.0 | 875 | 13100 | 2.2 | $4 \times 10^{11}$ |
| 4 | 2.0 | 1.0 | 5.0 | 875 | 15200 | 2.2 | $2 \times 10^{11}$ |

TABLE 3-continued

Dielectric Properties of Reoxidated Copper Internal Electrode MLC

| Example | Additives (mol %) | | | Sintering temperature (°C.) | Dielectric Properties | | |
| --- | --- | --- | --- | --- | --- | --- | --- |
| | x(PbO) | y(CaO) | z(CuO) | | Dielectric constant | Dielectric Loss (%) | Insulation resistance ($\Omega \cdot cm$) |
| 5 | 4.0 | 0.5 | 3.0 | 845 | 12900 | 1.7 | $8 \times 10^{10}$ |
| 6 | 4.0 | 0.5 | 5.0 | 845 | 14500 | 2.0 | $8 \times 10^{10}$ |
| 7 | 4.0 | 1.0 | 3.0 | 810 | 13300 | 1.8 | $5 \times 10^{11}$ |
| 8 | 4.0 | 1.0 | 5.0 | 810 | 12200 | 1.9 | $2 \times 10^{11}$ |

As described above, the characteristics of the present invention are first, enabling sintering to be performed at a low temperature of up to 810° C., secondly, having a dielectric constant of over 12,000, a dielectric loss of below 3%, and an insulation resistance of $10^9$ $\Omega \cdot cm$, thirdly, using copper, a low-cost base metal, as the material for the internal and outer electrodes to thereby allow simultaneous firing at a reduction atmosphere together with the dielectric composition, and fourthly, enhancing insulation resistance through reoxidation during the cooling process of the reduction atmosphere firing process.

What is claimed is:

1. A low-temperature sinterable dielectric composition [95PMN-5PT]-x(PbO)-y(CaO)-z(CuO) having a high dielectric constant wherein x=2 to 4 mol %, y=0.5 to 3.0 mol % and z=3 to 5 mol %.

2. A multi-layered ceramic capacitor having a dielectric composition in accordance with claim 1 and having internal and outer electrodes made of CuO.

* * * * *